(12) United States Patent
Pennline et al.

(10) Patent No.: US 6,387,337 B1
(45) Date of Patent: May 14, 2002

(54) CARBON DIOXIDE CAPTURE PROCESS WITH REGENERABLE SORBENTS

(75) Inventors: Henry W. Pennline, Bethel Park; James S. Hoffman, Library, both of PA (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 0 days.

(21) Appl. No.: 09/616,871

(22) Filed: Jul. 14, 2000

(51) Int. Cl.$^7$ ............................................. B01D 53/62
(52) U.S. Cl. ................... 423/220; 423/230; 423/232; 423/233; 422/216
(58) Field of Search .................. 422/216; 423/220, 423/226, 228, 230, 232, 233

(56) References Cited

U.S. PATENT DOCUMENTS

| | | | | |
|---|---|---|---|---|
| 4,330,430 A | * | 5/1982 | Lancet et al. | 252/420 |
| 4,937,059 A | * | 6/1990 | Kolts et al. | 423/230 |
| 5,030,610 A | * | 7/1991 | Sakata et al. | 502/400 |
| 5,160,708 A | * | 11/1992 | Kodama et al. | 422/171 |
| 5,169,607 A | * | 12/1992 | Krambrock et al. | 422/219 |
| 5,520,894 A | * | 5/1996 | Heesink et al. | 423/230 |

FOREIGN PATENT DOCUMENTS

JP             5-49918 A    *  3/1993    .................. 423/230

* cited by examiner

Primary Examiner—Steven P. Griffin
Assistant Examiner—Timothy C. Vanoy
(74) Attorney, Agent, or Firm—Daniel D. Park; Bradley W. Smith; Virginia B. Caress

(57) ABSTRACT

A process to remove carbon dioxide from a gas stream using a cross-flow, or a moving-bed reactor. In the reactor the gas contacts an active material that is an alkali-metal compound, such as an alkali-metal carbonate, alkali-metal oxide, or alkali-metal hydroxide; or in the alternative, an alkaline-earth metal compound, such as an alkaline-earth metal carbonate, alkaline-earth metal oxide, or alkaline-earth metal hydroxide. The active material can be used by itself or supported on a substrate of carbon, alumina, silica, titania or aluminosilicate. When the active material is an alkali-metal compound, the carbon-dioxide reacts with the metal compound to generate bicarbonate. When the active material is an alkaline-earth metal, the carbon dioxide reacts with the metal compound to generate carbonate. Spent sorbent containing the bicarbonate or carbonate is moved to a second reactor where it is heated or treated with a reducing agent such as, natural gas, methane, carbon monoxide hydrogen, or a synthesis gas comprising of a combination of carbon monoxide and hydrogen. The heat or reducing agent releases carbon dioxide gas and regenerates the active material for use as the sorbent material in the first reactor. New sorbent may be added to the regenerated sorbent prior to subsequent passes in the carbon dioxide removal reactor.

17 Claims, 1 Drawing Sheet

CARBON DIOXIDE CAPTURE PROCESS WITH REGENERABLE SORBENTS

U.S. GOVERNMENT RIGHTS

The United States Government has rights in this invention pursuant to the employer-employee relationship of the Government to the inventors as U.S. Department of Energy employees at the National Energy Technology Laboratory.

BACKGROUND OF THE INVENTION

Carbon dioxide ($CO_2$) is a greenhouse gas believed to contribute to global climate warming. The continued, and projected expanded, use of fossil fuels throughout the world will increase the discharge of $CO_2$. Without control of such emissions, global climate warming may prove to be disastrous to the environment. $CO_2$ can be removed from gas streams produced by the combustion of carbon-containing compounds. Methods for the removal of $CO_2$ from gas streams include chemical absorption/adsorption with a solvent, membrane separation, cryogenic fractionation, and adsorption using molecular sieves. Each of these processes are expensive and may be cost-prohibitive for a particular application.

Another method for the removal of $CO_2$ from a gas stream is dry scrubbing or chemical absorption/adsorption with a sorbent. A dry, regenerable sorbent process for the removal of $CO_2$ from a gas stream is described here. The sorbent used is an alkali-metal compound, alkaline-earth metal compound, or amine/amide compound by itself or deposited on a substrate. The sorbent is used to remove $CO_2$ from gas that can be produced by the combustion of coal, oil or natural gas and is then regenerated and recycled to repeat further $CO_2$ removal. The process is continuous and uses a moving-bed reactor in a cross-flow arrangement. Disposal of the recovered, concentrated carbon dioxide stream is a separate issue from what is described here.

Dry scrubbing processes are so named because the resulting absorptive/adsorptive material ("active material") being used is a solid. The dry scrubbing process described here can use dry alkali-metal compounds or dry alkaline-earth metal compounds. Wet scrubbing processes use a liquid active material and typically use an aqueous slurry as the active material. Wet scrubbing processes are most commonly known and used to remove sulfur dioxide ($SO_2$) from stack gases emitted by steam generation plants.

Wet scrubbing technologies require greater volume for processing than do dry processes. For example, if a wet scrubbing system were retrofitted onto an existing power plant, the land area required for the wet scrubber would be almost as vast as the power plant itself. With the elimination of large quantities of liquid required for a wet scrubbing process, the land area required will be considerably less, and the overall energy consumption required to operate the system will be reduced. The contact of $CO_2$-laden gas with a solid bed of active material (rather than with a wet active material) also allows for better temperature control. Therefore, the dry scrubbing process described here is economically advantageous over commercially available wet scrubbing technologies.

Both wet and dry scrubbing processes may be either disposable or regenerative systems. Regenerative systems are designed to further process the active material, making it suitable for subsequent productive passes through the scrubber. In disposable systems, the active material will make only one pass through the scrubber and will then be discarded. Disposable systems are less desirable due to the added expense and maintenance involved with the disposal of larger amounts of spent active material.

Both cross-flow and countercurrent flow arrangements are known and used in gas scrubbing processes. With a cross-flow arrangement, the active material travels from the top of the reactor to the bottom while the gas to be treated flows horizontally through the active material. In countercurrent flow systems, the active material moves from the top of the reactor toward the bottom while the gas enters the reactor at the bottom and flows upward and out the top. Similarly, moving-bed reactors and fluidized bed reactors are known and used in gas treatment processes. A cross-flow moving-bed reactor consists of a packed bed of solids that is fixed together and moves through the reactor. This panel of solids may be beads or pellets of sorbent that are stacked one on top of the other and held in place by retention screens. The flow of solids may occur very slowly within the moving-bed reactor. Whereas a fluidized bed is a highly mixed bed of material. Gas flows upward through the bed of solids with sufficient velocity to lift the bed out of a stationary position. A gas distributor is usually used within a fluidized bed to prevent the material from falling out of the bottom of the vessel.

Moving-bed reactors for the treatment of flue gas have been described (see U.S. Pat. No. 5,169,607 issued to Krambrock, et. al. ("Krambrock")). However, the reactor described by Krambrock uses a countercurrent flow of loose material and flue gas. Krambrock stated several reasons for not using a cross-flow arrangement. One of these reasons was the shorter retention time with cross-flow as compared to a countercurrent flow arrangement. Much of the research done on flue gas cleanup has focused on the removal of sulfur dioxide or nitrogen-containing contaminants ($SO_2$ or $NO_x$). The process described here works well with cross-flow arrangement because $CO_2$ ab/adsorption chemistry is sufficiently fast so as not to require long gas residence time.

Krambrock's focus was on providing uniform coverage of the loose material inside the reactor. No specific process for removal of waste gas constituents was described. The process described here uses a cross-flow arrangement of treatment material relative to gas flow. The process described here also focuses on the removal of $CO_2$ from the gas stream and specifically describes the process by which such removal may be accomplished and lists several appropriate sorbents.

Processes for the adsorption/desorption of $CO_2$ have been described before (see U.S. Pat. No. 4,937,059 issued to Kolts, et. al. ("Kolts")). The process described by Kolts was not continuous as Kolts describes a swing setup for absorption/desorption, and the sorbents used were alkali-metal compounds that were required to contain lanthanum oxide ($La_2O_3$). A continuous process is described here and, if the sorbents used are alkali-metal compounds, there is no requirement that the active material contain $La_2O_3$.

The process described here can be installed at new facilities or can be retrofitted into an existing producer of $CO_2$-containing gases, e.g. a utility or industrial boiler. Depending upon the optimum temperature of $CO_2$ absorption with the sorbent, the absorber could be placed anywhere along the gas stream that may have been or will be treated with another scrubbing process to remove other pollutants. The process may be installed anywhere along the gas path of new advanced power systems such as Integrated Gasification Combined Cycle (IGCC), Low-Emissions Boiler Systems (LEBS), High Performance Power Systems (HIPPS), and Pressurized Fluid Bed Combustors (PFB). In addition, the process may be utilized with any system that produces $CO_2$ either as a product, by-product, waste, or in any system where the objective is to concentrate $CO_2$.

OBJECTS OF THE INVENTION

The primary objective of this invention is to provide a continuous ab/adsorption process for removing carbon dioxide from a gas stream with the active material being an alkali-metal compound or alkaline-earth metal compound.

Another objective of this invention is to provide a process for regenerating and reusing the active material used to remove carbon dioxide from the gas stream.

SUMMARY OF THE INVENTION

A carbon dioxide-laden gas stream enters a moving-bed reactor and contacts an active material that is an alkali-metal compound or alkaline-earth metal compound by itself or supported on a substrate of carbon, alumina, silica, titania or aluminosilicate. The carbon dioxide reacts with the metal compound to generate bicarbonate when the active material is an alkali-metal compound or carbonate when the active material is an alkaline-earth metal compound.

The spent sorbent containing the bicarbonate or carbonate is moved through a second reactor where it is heated or treated with a reducing agent to release concentrated carbon dioxide gas and thereby regenerating the active material for reuse as the sorbent material in the first reactor. New, make up sorbent may be added to the regenerated sorbent prior to subsequent passes in the carbon dioxide removal reactor.

DETAILED DESCRIPTION OF THE PREFERRED EMBODIMENT

Figure 1:
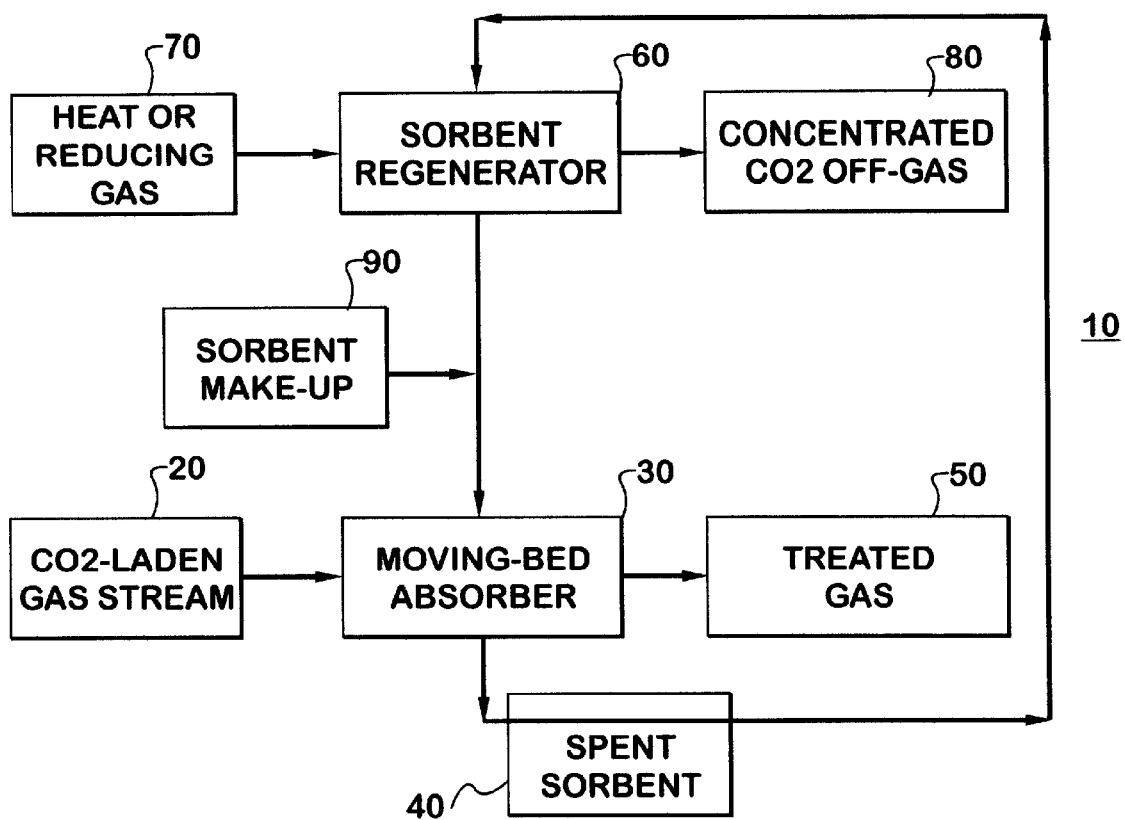
FIG. 1 is a schematic diagram of the process.

FIG. 1 is a schematic diagram of the $CO_2$ removal process. The $CO_2$-laden gas stream 20 enters the first reactor 30 in the continuous $CO_2$ removal process 10. The $CO_2$-laden gas flows horizontally through the reactor 30 where the temperature is maintained near constant; temperature range is about 200° F. to about 2000° F. The first reactor 30 is a crossflow moving-bed reactor. The first reactor 30 contains an active material, or sorbent, that moves vertically through the reactor 30 and is an alkali-metal compound or alkaline-earth metal compound. The sorbent may also be amine/amide compounds.

Alkali-metals are the elements in the left-most column of the periodic table of chemical elements except that hydrogen is not included. Lithium (Li), sodium (Na), potassium (K), rubidium (Rb), cesium (Cs), and francium (Fr) are generally recognized as alkali-metals. Alkaline-earth metals are in the second column from the left on the periodic table of elements and are beryllium (Be), magnesium (Mg), calcium (Ca), strontium (Sr), barium (Ba), and radium (Ra).

Molecular sieves are materials with porous and absorbing properties which chemically lock materials into their pores. Molecular sieves are also suitable sorbents for use in the process described here. Synthetic zeolites are examples of molecular sieves.

The active material of this process may be one of the above metals in its pure state or as a compound, e.g. carbonate, oxide, hydroxide, etc. The active material within the first reactor 30 will react with the $CO_2$-laden gas and produce a bicarbonate ($HCO_3^-$) if the sorbent is, or contains, an alkali-metal. The $CO_2$-laden gas will produce a carbonate ($CO_3^{2-}$) if the sorbent is, or contains, an alkaline-earth metal. Alkaline-earth metal oxides are effective active materials and remove carbon dioxide as follows: $ZO + CO_2 \rightarrow ZCO_3$ (where Z is an alkaline-earth metal). Water is required for some alkali-metal reactions and, in the case of treating $CO_2$-laden flue gas, there is sufficient moisture in the gas to allow the following reaction to occur: $X_2CO_3 + CO_2 + H_2O \rightarrow 2XHCO_3$ (where X is an alkali-metal). The metal, metal carbonate or metal oxide may be deposited on a substrate that is carbon, alumina, silica, titania, or an aluminosilicate. Similarly, the active material may be an amine/amide compound by itself or deposited on a substrate. For example, a primary amine will react with $CO_2$ as follows: $2RNH_2 + CO_2 \rightarrow RNHCOONH_3R$, where R is any alkyl or aryl group.

After passing through the first reactor 30, the treated gas 50 exits the reactor and will either enter the next treatment process (if the gas will be subjected to further treatment) or may be released into the ambient atmosphere. The spent sorbent 40 containing the carbonate or bicarbonate will be transported and enter the second reactor 60 where the temperature is maintained near constant; the temperature range is about 200° F. to about 2000° F. The second reactor 60 may be a moving-bed reactor or a fluidized bed reactor.

In the second reactor 60 a concentrated $CO_2$ off-gas stream 80 is released from the spent sorbent 40 by heating the spent sorbent 40 or by treating the spent sorbent 40 with a reducing agent 70. The reducing agent is natural gas, methane, carbon monoxide, hydrogen or a synthesis gas comprising a combination of carbon monoxide and hydrogen. The synthesis gas may be produced by the gasification of coal or other hydrocarbon reforming process, or by other industrial processes. Heavier hydrocarbon gases are likely good reducing gases as well.

An amount of new sorbent 90 may be added to the regenerated sorbent. The amount of sorbent added for make-up depends upon the amount of material that is depleted in the cycling between the first and second reactors 30 and 60. Bed height and pressure drop in the reactors 30 and 60 are monitored to determine when sorbent make-up 90 is added. A series of lock hoppers or vessels (not shown) with timed isolation valves are used to transport the sorbent around a closed loop similar to what is shown in the process diagram of FIG. 1. Small batches of sorbents are continuously placed in motion after a set level within the hopper is reached. Other techniques may be used to transport the sorbent between vessels. Make-up sorbent 90 is added between the first reactor 30 and the second reactor 60 by use of a feeder, level controller or equivalent device. However, the make-up sorbent may be added at any location along the cycle. The sorbent is returned to the first reactor 30.

What is claimed is:

1. A method for removing carbon dioxide from a gas stream, comprising the step of:

continuously moving a dry, solid sorbent, comprised of an active material, vertically through a first moving-bed reactor;

directing materially unaltered stream of gas containing carbon dioxide from a source to said first moving bed reactor;

flowing said unaltered stream of gas containing carbon dioxide through a bed of said sorbent perpendicular to the movement of said sorbent;

regulating a speed of said sorbent movement through said first moving-bed reactor relative to a flow rate of said gas such that the carbon dioxide reacts with the active material to remove the carbon dioxide from the gas;

continuously removing a spent sorbent from said first moving-bed reactor and moving said spent sorbent to a second reactor;

processing said spent sorbent in said second reactor so as to liberate a stream of carbon dioxide and produce a regenerated sorbent; and recycling said regenerated sorbent to the first moving-bed reactor.

2. The method according to claim 1, wherein said active material is selected from the group consisting of alkali metal carbonates, alkali-metal oxides, alkali-metal hydroxides, alkaline-earth metal carbonates, alkaline-earth metal oxides, or alkaline-earth metal hydroxides.

3. The method of claim 1, wherein said active material is a molecular sieve.

4. The method according to claim 1, further comprising the step of depositing the active material on a substrate prior to moving said sorbent through said first moving-bed reactor.

5. The method according to claim 4, wherein the substrate is selected from the group consisting of carbon, alumina, silica, titania, and aluminosilicates.

6. The method according to claim 4, wherein the substrate has a surface area such that the active material deposited thereon is available to react with said gas.

7. The method according to claim 1, wherein the sorbent regeneration step comprises heating the sorbent to a temperature sufficient to liberate the carbon dioxide.

8. The method according to claim 7, wherein the second reactor is a moving-bed reactor.

9. The method according to claim 7, wherein the second reactor is a fluidized bed reactor.

10. The method according to claim 1, wherein the sorbent regeneration step comprises chemically treating the spent sorbent to liberate the carbon dioxide.

11. The method according to claim 10, wherein the second reactor is a moving-bed reactor.

12. The method according to claim 10, wherein the second reactor is a fluidized bed reactor.

13. The method according to claim 10, wherein said step of chemically treating the sorbent to liberate the carbon dioxide is accomplished by exposing the spent sorbent to a regeneration gas that is selected from the group consisting of natural gas, methane, carbon monoxide, hydrogen, and a synthesis gas comprising a combination of carbon monoxide and hydrogen.

14. The method according to claim 1, further comprising the step of maintaining an approximately constant temperature in the first reactor in the range of between about 200° F. and about 2000° F.

15. The method according to claim 1, further comprising the step of maintaining an approximately constant temperature in the second reactor in the range of between about 200° F. and about 2000° F.

16. The method according to claim 1, wherein the process of continuously transporting the sorbent around the system, is achieved by utilizing a series of lock hoppers or vessels.

17. The method of claim 1, where a new quantity of fresh sorbent is added to said regenerated sorbent after it leaves the second reactor to compensate for sorbent lost in regenerating said spent sorbent.

* * * * *